May 23, 1961     E. P. KUHLMANN     2,985,352
RECORD MATERIAL FEEDING MEANS
Filed March 19, 1957     4 Sheets-Sheet 2
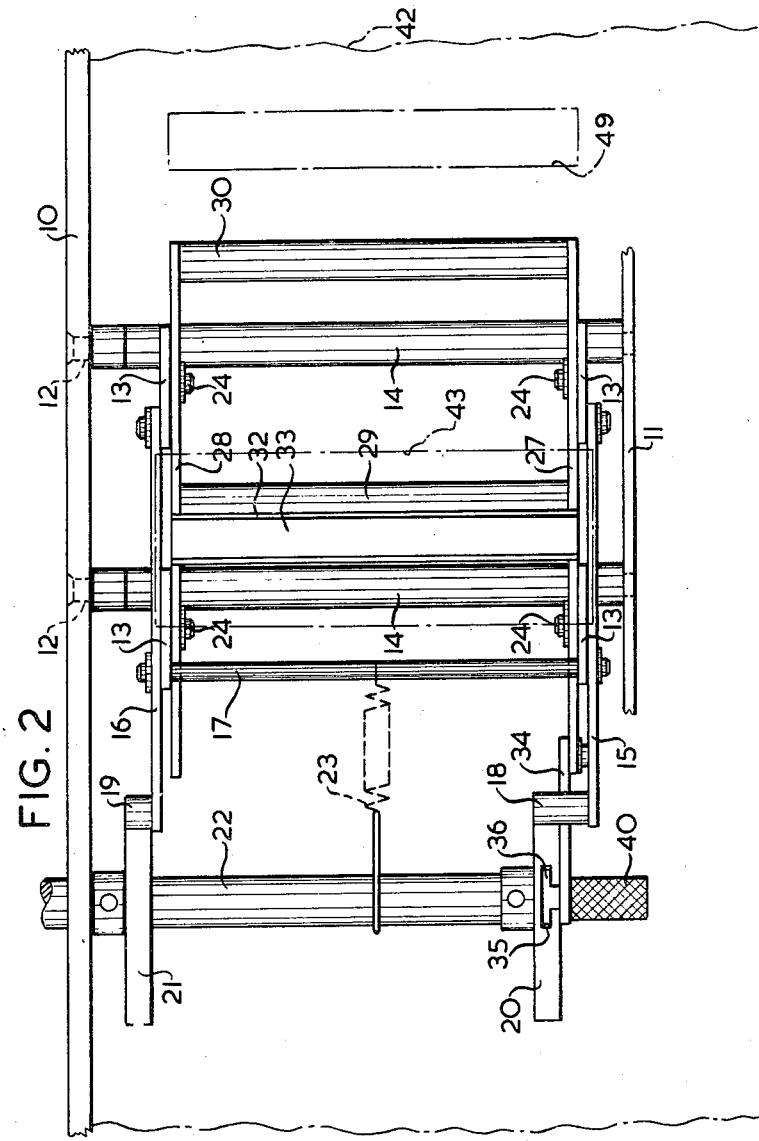
INVENTOR
EMIL P. KUHLMANN
BY
HIS ATTORNEYS May 23, 1961  E. P. KUHLMANN  2,985,352
RECORD MATERIAL FEEDING MEANS
Filed March 19, 1957  4 Sheets-Sheet 3
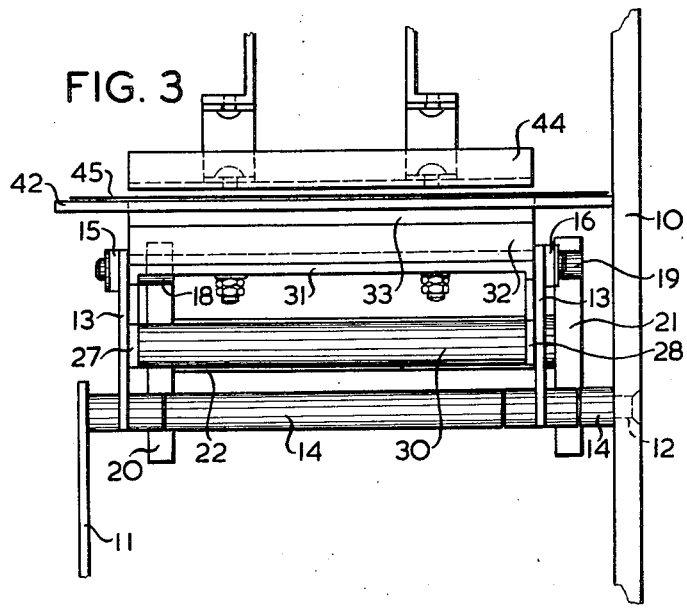
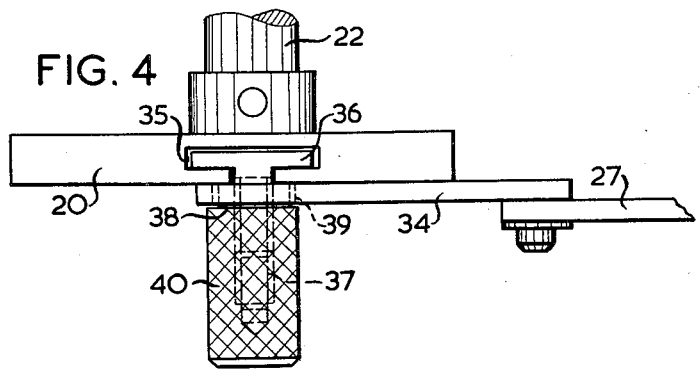
INVENTOR
EMIL P. KUHLMANN
BY
HIS ATTORNEYS May 23, 1961 E. P. KUHLMANN 2,985,352
RECORD MATERIAL FEEDING MEANS
Filed March 19, 1957 4 Sheets-Sheet 4
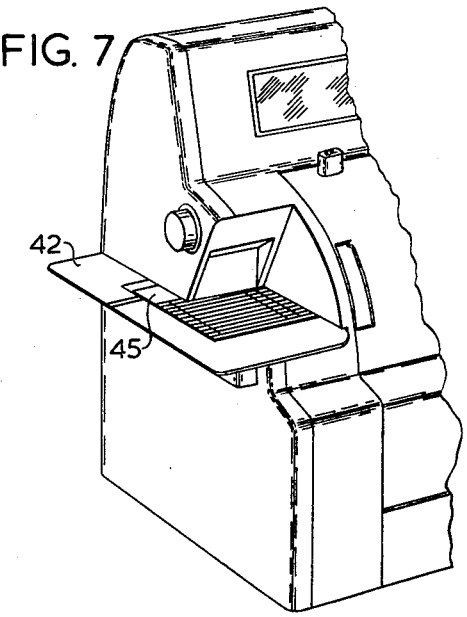
INVENTOR
EMIL P. KUHLMANN
BY Louis A. Kline
Henry Silbereis
HIS ATTORNEYS United States Patent Office 2,985,352
Patented May 23, 1961

2,985,352

RECORD MATERIAL FEEDING MEANS

Emil Paul Kuhlmann, Augsburg, Germany, assignor to The National Cash Register Company, Dayton, Ohio, a corporation of Maryland Filed Mar. 19, 1957, Ser. No. 647,083

Claims priority, application Great Britain Aug. 29, 1956

4 Claims. (Cl. 226—51)

This invention relates to record material feeding mechanism for cash registers and similar accounting machines.

It has previously been known to provide machines with record material feeding mechanism adapted to feed record material in one direction only and in fixed predetermined extents of movement. It has also been known to provide machines in which record material is fed to one of a number of different predetermined extents, and in one of two directions.

However, the first-mentioned known machines require considerable mechanical and structural alteration to enable either the extent or the direction of feed to be altered. The second-mentioned known machines are expensive to produce in view of the complicated differential and control mechanisms required, and also necessitate considerable alteration to vary the predetermined extents of feed.

It is, therefore, the main object of the present invention to provide mechanism whereby the extent and direction of feed of the record material can quickly and easily be varied to suit the requirements of any particular business system. For example, the same basic machine can be produced to suit the requirements of customers whose business systems require that either the top or the bottom of inserted record material be printed upon.

Another object of the present invention is to provide a micrometric adjustment of the extent of feed of record material, so that, for example, the same basic machine can quickly and easily be adapted to print in correct relationship to the customer's existing stationery, which may not be of a standard length.

Accordingly, the broadest feature of the present invention consists in the provision of a cash register or similar accounting machine including a record material feeding mechanism adapted to feed inserted record material in one or the other of two directions of movement, or not at all; driving mechanism for the record material feeding mechanism; and a manually-adjustable member, intermediate the driving mechanism and the feeding mechanism, to determine both the direction and the extent of feed.

The above and other, subsidiary, features of the present invention as applied, by way of example only, to one manner of carrying it into effect will now be described and are illustrated in the accompanying drawings.

In the drawings:

Fig. 2 is a top plan view of the mechanism of Fig. 1, taken along the line 2—2 of Fig. 1.

Fig. 3 is a front elevation of Fig. 1.

Fig. 4 is an enlarged plan view of the mechanism for adjusting the extent and the direction of feed of the record material.

Fig. 5 is a facsimile of a sales slip, illustrating a slip receiving two printed impressions at the top thereof, with the feed between impressions being in a direction from top to bottom.

Fig. 6 is a facsimile of a sales slip, illustrating a slip receiving two printed impressions at the bottom thereof, with the feed between impressions being in a direction from bottom to top.

Fig. 7 is a detail, perspective view, showing the location of the slip table in respect to the machine.

Figure 1:
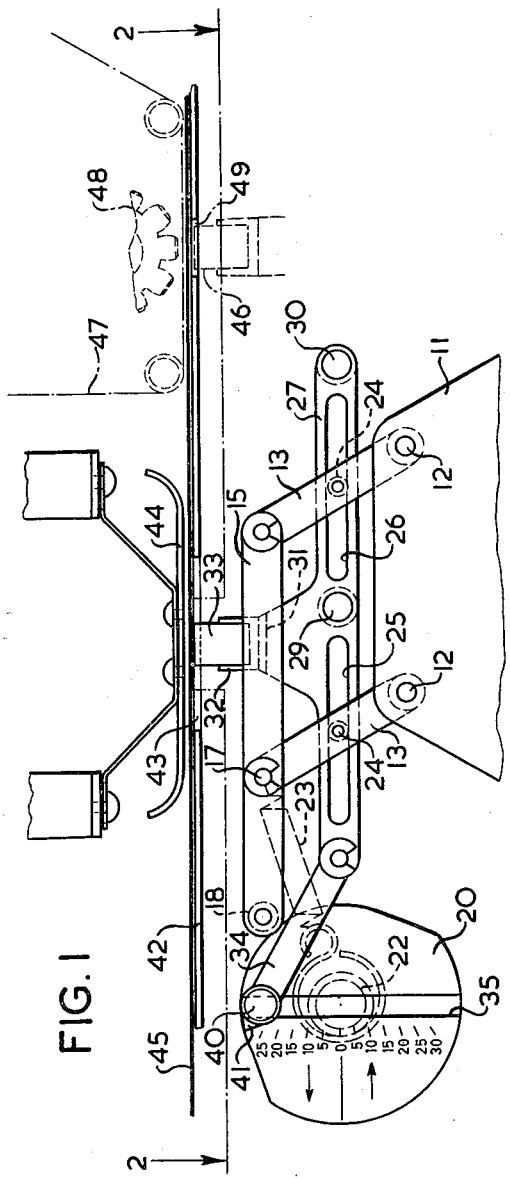
Fig. 1 is a side view of the record material feeding mechanism.

Journaled between a left-hand main side frame 10 (Figs. 2 and 3) of a cash register or similar accounting machine and a printer side frame 11 (Figs. 1 and 3) are a pair of shafts 12, each shaft having freely mounted thereon a pair of arms 13 maintained in spaced-apart relationship on said shafts by sleeves 14. Referring to Figs. 1 and 2, the upper ends of the arms 13 lying adjacent the frame 11 are pivotally connected to a link 15, and the upper ends of the arms 13 lying adjacent the frame 10 (see also Fig. 3) are pivotally connected to a link 16, the links 15 and 16 being connected together for unitary movement by a cross rod 17 (see Fig. 2).

Mounted on forwardly-extending limbs of the links 15 and 16 (Figs. 1 and 2) are rollers 18 and 19, respectively, which rollers are urged into engagement with the peripheries of plate cams 20 and 21, secured to a shaft 22, by means of a spring 23 tensioned between said shaft and the cross rod 17. The shaft 22 and the cams 20 and 21 receive one clockwise rotation by means of any suitable driving mechanism during each machine operation in which it is desired to feed inserted record material.

Approximately midway of each of the arms 13 is secured a roller stud 24, each stud 24 projecting through slots 25 and 26 formed in side plates 27 and 28 of a record material feeding assembly. The side plates 27 and 28 are of similar shape and are secured in spaced relationship by cross rods 29 and 30 and a bridge member 31, to which is secured a channel-shaped member 32 having mounted therein a block 33 of rubber or similar material.

Referring to Figs. 1, 2, and 4, a link 34 is pivoted at its forward end to a rearwardly-extending portion of the side plate 27 and, at its rearward end, is adjustably pivoted to the cam 20. Referring particularly to Fig. 4, a T-shaped groove 35 extends across the diameter of the cam 20 and is engaged by the T-shaped head 36 of a screw 37 slidable to any desired position along the groove 35. A hub 38, freely mounted on the screw 37, engages a bearing collar 39 pressed into the hole in the rearward end of the link 34, the hub 38 being of a slightly greater thickness than the link 34, so as to permit rotation of the latter when a knurled nut 40 on the screw 37 is tightened to lock the hub 38 against the side of the cam 20 for rotation therewith. The rearward end of the link 34 is formed as a pointer 41, and, when the knurled nut 40 is slackened, can be adjusted across the diameter of the cam 20, so that, when the nut 40 is tightened and the cam 20 rotated, inserted record material will be fed to an extent and in a direction, as indicated by the millimeter graduations and directional arrows engraved on the cam 20, to which the pointer has been adjusted.

A printing table 42 extends above the record material feeding mechanism and has therein an opening 43, through which the block 33 can be raised and moved in either of its record material feeding directions.

Resiliently mounted above the opening 43 in the printing table 42 is a pressure plate 44, which cooperates with the block 33 to feed record material 45 inserted therebetween, as described hereinafter. If desired, any other suitable resiliently mounted device, such as an endless steel band, may be substituted for the pressure plate 44.

A further opening 49 is provided toward the front of the printing table 42, a printing platen 46 being adapted to pass therethrough in known manner in order to force inserted record material 45 against an ink ribbon 47 and type wheels 48 to take an impression from the latter. As the operation of the printing mechanism is known and is irrelevant to the present invention, it is not described herein and has been illustrated by dot-and-dash lines in Fig. 1 only.

*Mode of operation*

If it is desired to render the feeding mechanism inoperative, the knurled nut 40 is first slackened, the pointer 41 on the link 34 is moved opposite the zero graduation on the cam 20 (Fig. 1), and the nut 40 is retightened. At approximately 90 degrees of the clockwise movement of the shaft 22, the larger radii of the cams 20 and 21 cooperate with the rollers 18 and 19 to shift the links 15 and 16 forwardly, rocking the arms 13 clockwise about their pivots on the shafts 12. Clockwise movement of the arms 13, through the cooperation of the roller studs 24 with the slots 25 and 26 in the side plates 27 and 28, causes the block 33 to be raised to press record material 45, inserted on the printing table 42, into contact with the pressure plate 44. However, when the pointer 41 is adjusted to zero position, the left-hand end of the link 34 is positioned on the axis of rotation of the shaft 22, so that rotation of the cam 20 does not impart any movement to the link 34, the side plates 27 and 28, and the block 33. Consequently, feed is not imparted to the record material 45 through its cooperation with the block 33.

If it is desired to feed the record material 45 (Fig. 6) from its inserted position to a position thirty millimeters toward the left, as viewed in Figs. 1 and 7 the link 34 is adjusted to position its pointer 41 to the position shown in Fig. 1 in the manner previously described. Clockwise movement of the shaft 22, with the link 34 adjusted to its illustrated position, causes the cam 20 to shift the link 34, the side plates 27 and 28, and the block 33 to the right prior to the raising of said block under control of the cams 20 and 21, as previously described. When the block 33 has reached the terminus of its movement to the right, the cams 20 and 21 raise the block 33 and maintain it in contact with the inserted record material 45 until the link 34, under control of movement of the cam 20, has shifted the block 33 to its full extent toward the left. Due to the cooperation of the rubber block 33 with the record material 45, the latter is gripped and drawn to the left, sliding along the under side of the pressure plate 44, to an extent corresponding to the extent of longitudinal movement toward the left imparted to the block 33 by the link 34. Immediately after cessation of movement of the block 33 toward the left, the lower radii of the cams 20 and 21 come into cooperation with the rollers 18 and 19, so as to permit the spring 23 to lower said block out of contact with the record material 45, the link 34 thereafter idly returning the block 33 to its central home position under control of the cam 20.

If it is desired to feed the record material 45 (Fig. 5) from its inserted position to a position fifteen millimeters toward the right, as viewed in Figs. 1 and 7, the link 34 is adjusted to position its pointer 41 to the graduation "15" below zero position, where the arrow indicates a direction of feed toward the right. Clockwise movement of the shaft 22 with the link 34 adjusted to this position causes the cam 20 to shift the link 34, the side plates 27 and 28, and the block 33 to the left prior to the raising of said block under control of the cams 20 and 21. When the block 33 has reached the terminus of its permitted movement to the left, the cams 20 and 21 raise the block 33 and maintain it in contact with the inserted record material 45 until the link 34, under control of movement of the cam 20, has shifted the block 33 to its permitted extent of movement toward the right. Movement of the block to the right, in its raised position, shifts the record material 45 to the right, as previously explained, a distance of fifteen millimeters. Immediately after cessation of movement of the block 33 toward the right, the lower radii of the cams 20 and 21 come into cooperation with the rollers 18 and 19, so as to permit the spring 23 to lower said block out of contact with the record material 45, the link 34 thereafter idly returning the block 33 to its central home position under control of the cam 20.

It will thus be seen that positioning the pointer 41 of the link 34 to anyone, or intermediate any one, of the graduations on the cam 20 causes a corresponding degree of movement of the record material in the direction indicated by the relevant one of the arrows on the cam 20.

While the embodiment of the invention shown and described herein is admirably adapted to fulfill the objects primarily stated, it is to be understood that it is not intended to confine the invention to the particular form or embodiment disclosed herein, for it is susceptible of embodiment in various other forms.

What is claimed is:

1. In a record-material-feeding mechanism for feeding record material any adjustable predetermined extent in either of two opposite directions, the combination of record-material-gripping means; a shiftable means to support said gripping means; engaging means slidably supporting said shifting means and operable to move said record-material-gripping means into and out of engagement with the record material; rotatable operating means for said shifting means, said operating means always rotating in the same direction regardless of the direction of feed to be imparted to the record material; a link interconnecting said operating means and said shiftable means, said link having one end pivotally connected to said shiftable means and having the other end adjustably connected to the operating means; means for shifting said other end of the link to any desired distance from and in either of two opposite directions from the center of rotation thereof, whereby in an operation of said operating means the shiftable means is first shifted in a direction and to an extent determined by the connection of the link to the operating means, and after being so shifted is given a record-material-feeding movement of the desired extent and direction; and means for operating the engaging means to bring said record-material-gripping means into engagement with the record material during the record-material-feeding movement of the shiftable means.

2. In a record-material-feeding mechanism for feeding record material any adjustable predetermined extent in either of two opposite directions, the combination of record-material-gripping means normally disengaged from the record material; a shiftable means to support said gripping means; rotatable operating means for said shifting means, said operating means always rotating in the same direction regardless of the direction of feed to be imparted to the record material; a link interconnecting said operating means and said shiftable means, said link having one end pivotally connected to said shiftable means and having the other end adjustably connected to the operating means; means for shifting said other end of the link to any desired distance from and in either of two opposite directions from the center of rotation thereof, whereby in an operation of said operating means the shiftable means is first shifted from a starting position in a direction and to an extent determined by the connection of the link to the operating means, and after being so shifted is given a record-material-feeding movement of the desired extent and direction and is finally returned to starting position; and means to move said record-material-gripping means into engagement with the record material only during the record-material-feeding movement of the shiftable means.

3. In a record-material-feeding mechanism for feeding record material any adjustable predetermined extent in either of two opposite directions, the combination of record-material-gripping means normally disengaged from the record material; a shiftable means to support said gripping means; engaging means slidably supporting said shifting means and operable to move said record-material-gripping means into and out of engagement with the record material; rotatable member for operating said shifting means, said member containing a slot extending across the center of its rotation; a link interconnecting said rotatable member and said shiftable means, said link having one end pivotally connected to said shiftable means and having a stud located at the other end, said stud slidably engaging the slot of the rotatable member; means for clamping the stud in an adjusted position in the slot at any desired distance from and in either of two opposite directions from the center of rotation thereof, whereby in an operation of said rotatable member the shiftable means is first shifted in a direction and to an extent determined by the position of the stud in the slot of the rotatable member, and after being so shifted is given a record-material-feeding movement of the desired extent and direction; and means for operating the engaging means to bring said record-material-gripping means into engagement with the record material during the record-material-feeding movement of the shiftable means.

4. In a record-material-feeding mechanism, the combination of record-material-gripping means; a shiftable means to support the gripping means; an operating link pivotally connected to the shiftable means; a rotatable disk; a slot extending across the center of the disk; a stud on the link and extending into the slot of the disk, the stud being adjustable along the slot to any desired position away from the center of the disk on either side of the center to determine the extent and the direction of movement of the record material when the disk is rotated; engaging means on which the shiftable means is mounted for shifting movement when the disk is rotated and means to operate the engaging means to move the record material during a fixed portion of the rotation of the disk to cause the record material to be fed in the direction determined by the setting of the stud in the slot.

References Cited in the file of this patent

UNITED STATES PATENTS

| | | |
|---|---|---|
| 1,986,678 | Laencher | Jan. 1, 1935 |
| 2,439,070 | Bailey et al. | Apr. 6, 1948 |
| 2,683,600 | Sigoda | July 13, 1954 |
| 2,744,751 | Janz | May 8, 1956 |